(12) United States Patent
McDevitt et al.

(10) Patent No.: US 7,999,236 B2
(45) Date of Patent: Aug. 16, 2011

(54) DUAL MODALITY DETECTION SYSTEM OF NUCLEAR MATERIALS CONCEALED IN CONTAINERS

(75) Inventors: Daniel Bruno McDevitt, Niskayuna, NY (US); Jeffrey Wayne Eberhard, Albany, NY (US); Bernhard Erich Hermann Claus, Niskayuna, NY (US); Scott Stephen Zelakiewicz, Niskayuna, NY (US); Joseph Bendahan, San Jose, CA (US)

(73) Assignee: Mropho Detection, Inc., Newark, CA (US)

( * ) Notice: Subject to any disclaimer, the term of this patent is extended or adjusted under 35 U.S.C. 154(b) by 582 days.

(21) Appl. No.: 11/704,827

(22) Filed: Feb. 9, 2007

(65) Prior Publication Data

US 2008/0191140 A1 Aug. 14, 2008

(51) Int. Cl.
*G01T 3/00* (2006.01)
*G01T 3/06* (2006.01)
*G01N 23/04* (2006.01)

(52) U.S. Cl. ......... 250/390.11; 250/390.01; 250/370.09; 378/57; 376/154

(58) Field of Classification Search ............. 250/390.11, 250/390.01, 390.04, 390.1, 370.1, 358.1; 376/154; 378/57
See application file for complete search history.

(56) References Cited

U.S. PATENT DOCUMENTS

| | | | |
|---|---|---|---|
| 4,897,550 A * | 1/1990 | Bernard et al. | 250/390.01 |
| 5,393,981 A | 2/1995 | Szabo et al. | |
| 5,481,114 A | 1/1996 | Daniel et al. | |
| 6,011,266 A * | 1/2000 | Bell | 250/390.01 |
| 6,100,532 A * | 8/2000 | Bryman | 250/369 |
| 6,891,470 B2 | 5/2005 | Bobinc, Jr. | |
| 6,936,820 B2 | 8/2005 | Peoples | |
| 7,030,755 B2 | 4/2006 | Bobinc, Jr. | |
| 7,141,799 B1 * | 11/2006 | Neal et al. | 250/390.11 |
| 7,142,625 B2 | 11/2006 | Jones et al. | |
| 2001/0046274 A1 * | 11/2001 | Craig et al. | 376/154 |
| 2002/0036269 A1 * | 3/2002 | Shahar et al. | 250/370.1 |
| 2005/0023479 A1 * | 2/2005 | Grodzins | 250/390.11 |
| 2005/0105665 A1 * | 5/2005 | Grodzins et al. | 376/157 |
| 2006/0049362 A1 * | 3/2006 | Friedman et al. | 250/374 |
| 2006/0266948 A1 | 11/2006 | Hofstetter et al. | |
| 2007/0272874 A1 | 11/2007 | Grodzins | |

OTHER PUBLICATIONS

"Neutron moderator," Wikipedia website. [Retrieved Nov. 30, 2006]. Retrieved from Internet: URL: http://en.wikipedia.org/wiki/Neutron moderator, 3 pages.
"Scintillator," Wikipeedia website. [Retrieved Apr. 7, 2009]. Retrieved from Internet: URL: http://en.wikipedia.org/wiki/Scintillator, 10 pages.
Shenon, Philip, "US Begins Screening All Travelers for Nuclear Material," Sidney Morning Herald. [Retrieved Dec. 1, 2006]. Retrieved from Internet: URL: http://smh.com.au/articles/2003/03/02/104654007829.htlm., 2 pages.

(Continued)

*Primary Examiner* — David P Porta
*Assistant Examiner* — Jessica L Eley
(74) *Attorney, Agent, or Firm* — Armstrong Teasdale LLP

(57) ABSTRACT

Dual modality detection devices and methods are provided for detecting nuclear material, the devices include a neutron detector including multiple neutron detection modules; and a gamma detector including multiple gamma detection modules, where the multiple neutron detection modules and the multiple gamma detection modules are integrated together in a single unit to detect simultaneously both gamma rays and neutrons.

10 Claims, 5 Drawing Sheets

OTHER PUBLICATIONS

Sprouse, Dale, "Screening Cargo Containers to Remove a Terrorist Threat," Lawrence Livermore National Laboratory, Science & Technology Review, May 2004, 4 pages.

PCT/US2007/085852; International Search Report and The Written Opinion of the International Searching Authority dated Aug. 31, 2009, 18 pages.

* cited by examiner

DUAL MODALITY DETECTION SYSTEM OF NUCLEAR MATERIALS CONCEALED IN CONTAINERS

FEDERAL RESEARCH STATEMENT

This invention was made with Government support under Contract No. N660001-05-D-6033 awarded by the United States Government. The Government has certain rights in the invention.

BACKGROUND

The present disclosure generally relates to a dual modality detection system for detecting gamma rays and neutrons associated with the presence of nuclear material in containers.

There is a growing concern that terrorists or others may attempt to import into the United States or some other country radioactive or nuclear material, which may then be used for the construction of a nuclear weapon for carrying out terrorist objectives. One way of terrorists can ship such radioactive or nuclear material is to hide the material among or within seemingly innocuous cargo containers. For example, such nuclear material could be placed within a standard, sealed cargo container of the type typically employed for shipping cargo by sea, rail, air, or truck. The nuclear material could be positioned in such a sealed cargo container along with other innocuous goods with the container being positioned, for example, within the hold of a large container ship which may be transporting a thousand or more such containers from one location to another. The entire contents of a seagoing cargo container can have a mass as large as 27 metric tons, can span the range of all materials that are common to international commerce, and can range from homogeneous to heterogeneous loads with random or regular voids. As such, detection of radioactive or nuclear material contained in such containers can be a daunting and difficult task.

One of the problems inherent to detecting the relatively small amounts of radioactive or nuclear material hidden within larger masses of other material in containers is the attenuation of the radiation signature and/or the attenuation of the interrogating radiation by intervening cargo. Other problems are the presence of background radiation from which the signal must be distinguished and the limited amount of inspection time available for the development of a significant signal.

Because of the thickness of the intervening walls in containers and the cargo contained therein, which can be greater than 1 meter or more, highly energetic radiation such as gamma rays and neutrons can penetrate this thickness. As such, nuclear inspection methods are generally divided into two classes: passive and active. Passive inspection methods are employed to detect nuclear materials that are naturally radioactive such that their intrinsic radiations may provide a useful signature. In contrast, active inspection methods, also referred to as active interrogation, generally include injecting high-energy neutrons or photons (x-rays or gamma rays) into the container to cause a the nuclear material contained therein to undergo fission and emit characteristic high-energy neutrons and/or gamma rays that can then be detected outside the container. In this manner, the active interrogation method is nondestructive and uses penetrating nuclear radiation, such as neutrons or photons, as a probe to stimulate a unique radiation signature that will identify a material or characteristic of interest.

Current equipment to determine the presence of radioactive or nuclear material employ a stand-alone "gamma ray" detection device for detection of gamma rays (e.g., detecting the number of counts, or gammas) or a stand-alone neutron detector for detecting neutrons (e.g., delayed neutrons). Gamma rays excite a gamma ray detector by interacting with its electrons to cause ionization.

Neutrons, however, are neutral particles that don't interact appreciably with electrons but do undergo reactions with the nuclei of atoms. Neutron detection then becomes a two-step process. The sensitive material of a neutron detector contains atoms with nuclei that are highly susceptible to reacting with neutrons. The nuclear reactions produce energetic charged particles that interact with electrons and produce the necessary ionization needed for detection.

Fast neutrons can be detected employing high-energy interactions with charge particles, which generate the detection signal. Fast neutrons can also be detected by slowing them down to thermal energies with a moderator and using a material with a high capture cross section to produce the detected signal. The sensitive material could be a gas such as $^3$He or $^{10}$BF$_3$ encapsulated in tubes, or it could be a substance such as gadolinium embedded in a suitable medium, e.g., a scintillating liquid or scintillating fiber.

FIGS. 1 and 2 illustrate a prior art detection system 10 that includes an exemplary stand-alone gamma ray detector 12 and an exemplary stand-alone neutron detector 14. The gamma ray detector 12 generally includes a scintillator 16 and a photodetector 18 configured for detecting gamma rays. The scintillator 16 is generally formed of a substance that interacts with high energy (ionizing) electromagnetic or charged particle radiation then, in response, fluoresces photons at a characteristic Stokes shifted (longer) wavelength, releasing the previously absorbed energy. The photodetector 18 is used to detect the light emitted by the scintillator 16.

The illustrated neutron detector 14 generally includes a moderator 22 and tubes 24 filled with a He-3 gaseous medium 26 for detecting neutrons. The moderator 22 is generally used to reduce the energy of the neutron so that they can interact with the He-3 gaseous medium in a manner well known in the art. The moderator can be formed of a plastic such as polyethylene.

Because the detectors are generally configured to detect relatively weak emission signals of nuclear material deeply hidden within containers, relatively large detectors are required. Moreover, since the current state of art uses stand-alone detectors, i.e., one for gamma ray detection and one for neutron detection, the process and equipment can become expensive, complex and require a large footprint.

Accordingly, there is a need in the art for a dual modality detection system that provides a smaller footprint and can provide simultaneous detection of the gamma ray and neutron signatures of nuclear material hidden within containers with minimal false alarms.

BRIEF DESCRIPTION

Disclosed herein are dual modality detection system for detecting gamma rays and neutrons characteristic of the nuclear material in containers. In one embodiment, the dual modality detection device includes a scintillator containing hydrogen, the scintillator being configured to detect gamma rays and to function as a neutron moderator; a plurality of neutron detectors disposed within the scintillator and configured to detect neutrons; and a photodetector in optical communication with the scintillator for identifying gamma rays and neutrons.

In another embodiment, the dual modality detection device for simultaneously detecting both gamma rays and neutrons follows active interrogation of nuclear materials. In this embodiment, the device comprises a plurality of adjoining modules comprising neutron detection modules and gamma ray detection modules, wherein the neutron modules comprise a moderator material and a neutron sensitive material disposed within the moderator material, and wherein the gamma ray detection modules comprise a scintillator in optical communication with a photodetector.

Another embodiment describes a process for detecting a nuclear material concealed in a container including actively interrogating the nuclear material disposed within the container to cause a fission reaction, generating gamma rays and neutrons characteristic of the nuclear material, and simultaneously detecting the gamma rays and the neutrons. The detecting includes reacting the gamma rays with a scintillator material to emit a wavelength pattern characteristic of the gamma rays specific to the nuclear material and moderating the neutrons with the scintillator and reacting the neutrons with a neutron sensitive material to form ionized particles, wherein the neutron sensitive material is disposed within the scintillator.

In another embodiment, the dual modality detection device for simultaneously detecting both gamma rays and fast neutrons includes a neutron detector configured to detect fast neutrons, and a scintillator positioned behind the neutron detector and configured to detect gamma rays, where the scintillator is used to reflect neutrons and increase detection of the neutrons. In the embodiment, a photodetector in optical communication with the scintillator is included for detection of gamma rays and neutrons.

The disclosure may be understood more readily by reference to the following detailed description of the various features of the disclosure and the examples included therein.

DETAILED DESCRIPTION OF EXEMPLARY EMBODIMENTS

The present disclosure is generally directed to a dual modality detection system for detecting both gamma rays and neutrons following active interrogation, i.e., an integrated system that monitors fission events of nuclear material induced by the active interrogation and measures the subsequent gamma ray and neutron signatures. In one embodiment, the dual modality detection system includes removing the neutron moderator that would normally be present in a stand-alone neutron detector and forming the neutron detector inside a scintillator of the gamma ray detector. By using the scintillator in this manner, the neutron and gamma ray detection capabilities can be combined into a single integrated unit.

Advantageously, removing the separate neutron moderator as presently employed in the prior art reduces the cost, weight, and complexity of the system. Moreover, combining these detectors in one unit will increase detection efficiency since detection of both gamma rays and neutrons are now possible within a footprint of a single stand-alone detector and both detectors can be placed closer to the source of the induced radiation. This increased efficiency translates into lower cost, and/or lower false alarm rates and increased probability of detection of nuclear materials smuggled into cargo containers.

As used herein, the term "fission event" refers to a process, either spontaneous or induced, by which a nucleus splits into two or more large fragments of comparable mass, simultaneously producing additional neutrons (on the average) and a large amount of energy. Gamma rays are the highly energized, deeply penetrating photons that radiate from the nucleus during the fission event and frequently accompanies radioactive decay. The term "nuclear material" includes, but is not limited to, plutonium, uranium-233, uranium enriched in the uranium-233 or uranium-235 isotopes, as well as, any other materials that may be deemed as nuclear materials by the United States Atomic Act. Also, nuclear material may include fissile material or fissionable material.

Figure 1:
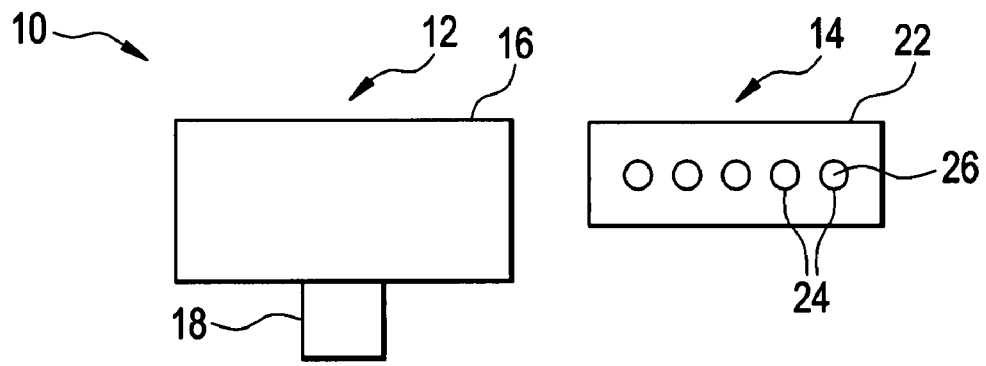
FIG. 1 illustrates a top down view of a prior art nuclear material detection system that includes a stand-alone gamma detector and a stand-alone neutron detector.
Figure 2:
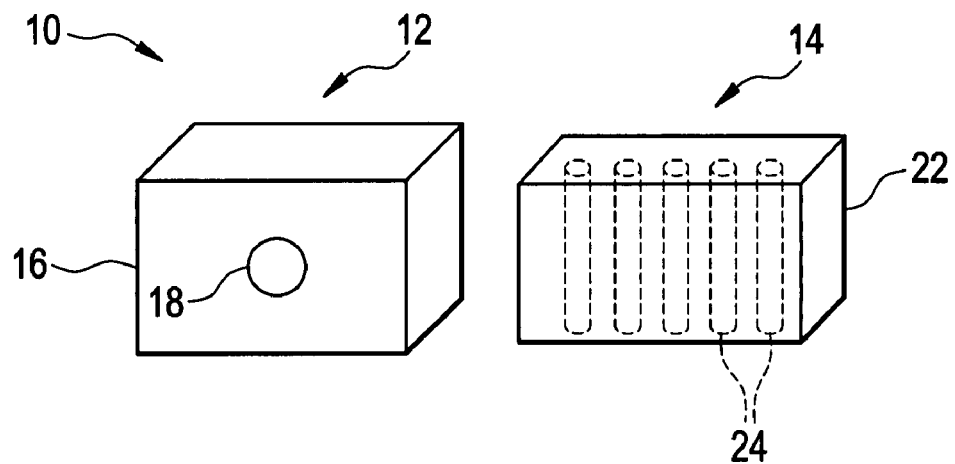
FIG. 2 illustrates a perspective view of the prior art nuclear material detection system of FIG. 1.
Figure 3:
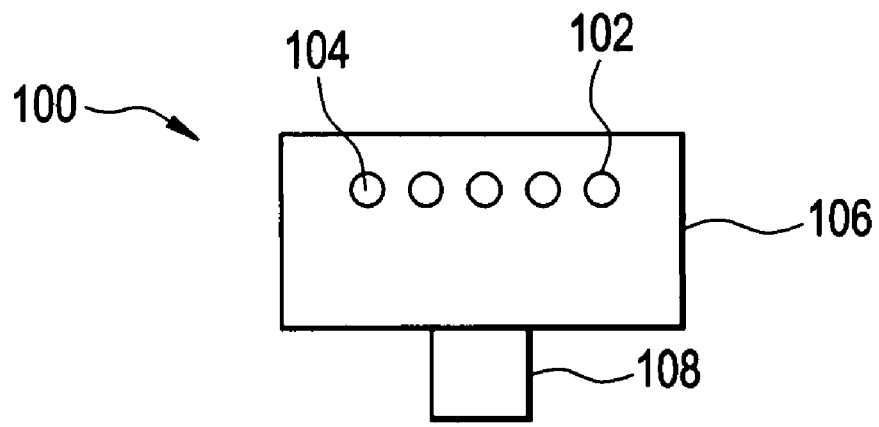
FIG. 3 is a top down view of a dual modality detection system in accordance with an embodiment of the invention.
Figure 4:
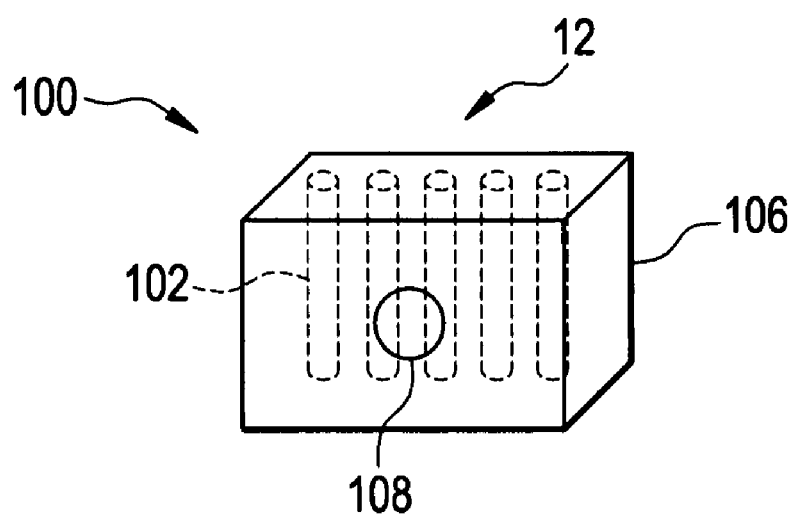
FIG. 4 is a perspective view of the dual modality detection system of FIG. 3.

FIGS. 3 and 4 illustrate top down and perspective views of an exemplary embodiment of a dual modality device 100 for detecting both gamma rays and neutrons emitted from nuclear materials. The device 100 generally includes placing neutron detection tubes 102 filled with a He-3 gaseous medium inside holes 104 formed in a plastic scintillator 106. By doing so, it has been found that the plastic scintillator 106 so formed acts as a moderator for the He-3 gaseous medium. Moreover, since the plastic scintillator 106 is relatively transparent, the presence of the He-3 tubes 102 will not significantly affect the detection of scintillated light. A photodetector 108, e.g., a photomultiplier tube, is in optical communication with the plastic scintillator.

The plastic scintillator 106 is not intended to be limited to any particular material. For example, the plastic scintillator can be formed of a transparent polymer such as polystyrene that contains luminescent additives. Moreover, although plastic is discussed herein as a non-limiting example of a type of scintillator that may be used, the scintillator material is not limited to plastic, and the scintillator material may be doped or undoped. Further, the scintillator may be formed of any suitable material having hydrogen or any suitable material having the properties of acting as a moderator and a gamma ray detector.

A moderator material is typically used for reducing the energy of the neutrons so that the neutrons can interact with the He-3 gas in the He-3 tubes 102 and thus be detected. Since the plastic scintillator 120 is very transparent, the presence of the He-3 tubes 102 will not significantly affect the detection of scintillated light. In this manner, the plastic scintillator 106 functions as a moderator material such that the neutron and gamma capabilities can be integrated into a single unit.

Further, Cd (cadmium) or another thermal neutron absorber could be placed around the moderator to reduce neutron background and to enable the differential dieaway technique (DDA). DDA allows for the detection of prompt neutrons resulting from the active interrogation. The thermal neutron absorber prevents thermal neutrons from impinging on the detector to produce a signal with a time structure similar to the one produced from fission.

The neutron detector (e.g., He-3 tubes) may be partially or completely disposed within the plastic scintillator. Also, the neutron detector (e.g., He-3 tubes) may be placed in front of the plastic scintillator, behind the plastic scintillator, and/or between the plastic scintillator.

Further, by embedding the He-3 tubes directly inside the plastic scintillator of the gamma detector, such an arrangement will allow the entire neutron moderator (e.g., a plastic scintillator) to be sensitive to gamma rays, thus increasing detection efficiency of the gamma rays and reducing space. Additionally, based on design preferences, those skilled in the art may choose to include an additional moderator material to assist with neutron detection. For example, the tube can include a layer of material that functions as a moderator, a material that is not sensitive to gamma rays.

Figure 5:
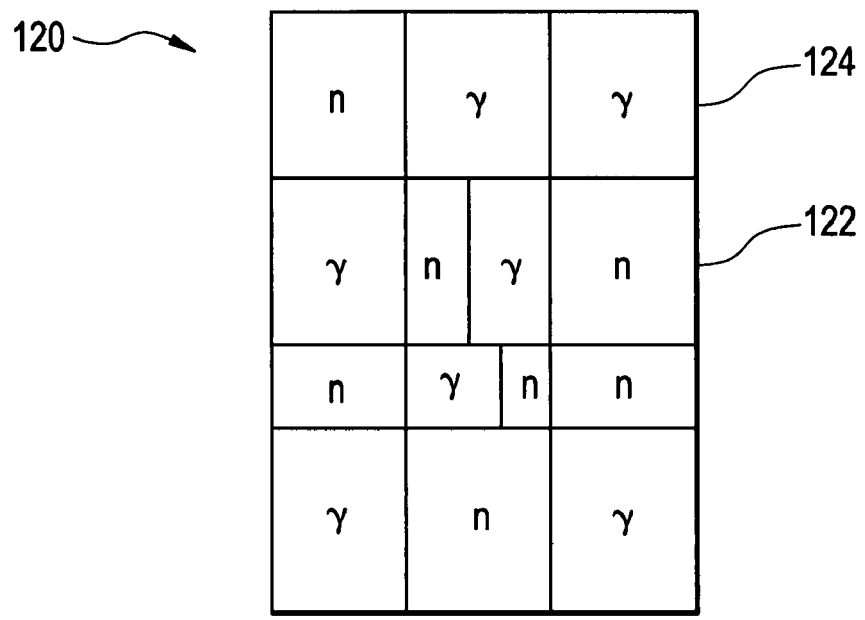
FIG. 5 illustrates a dual modality detection system that includes a tiled configuration of gamma ray and neutron detectors in accordance with one embodiment of the invention.
Figure 6:
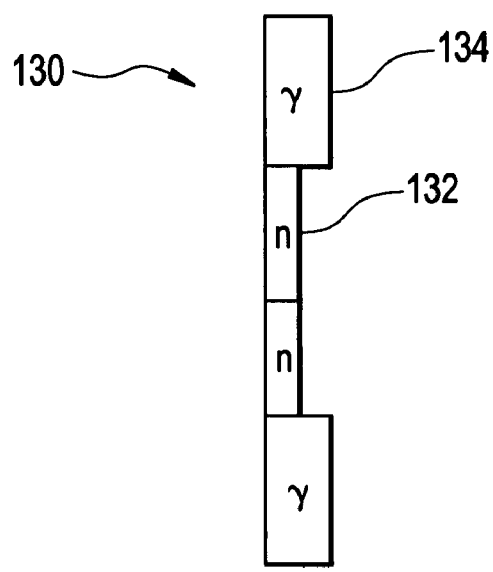
FIG. 6 illustrates a dual modality detection system that includes a stacked configuration of gamma ray and neutron detectors in accordance with an embodiment of the invention.

FIG. 5 depicts an exemplary embodiment of a dual modality detection device 120 for detecting both gamma rays and neutrons. The detection device includes tiled neutron and gamma ray detectors modules 122 and 124, respectively. It should be noted that the individual detection modules 122, 124 may or may not have the same thickness, may or may not have the same density, may or may not be formed of the same materials, and the like. Still further the arrangement of neutron and gamma detection modules may be varied in any pattern. In other embodiments, the neutron and gamma detection module faces may or may not vary within a defined area and the number of either the neutron detection modules or the gamma detection modules may or may not be equal. Likewise, the same "tiled" pattern of the integrated detector arrangement may or may not change. It should be apparent that the various modules can be formed by disposing the He-3 tubes within selected regions of the plastic scintillator as described above. FIG. 6 illustrates an exemplary stacked configuration of a dual modality detection device 130 of gamma ray modules 132 and neutron modules 134.

Figure 7:
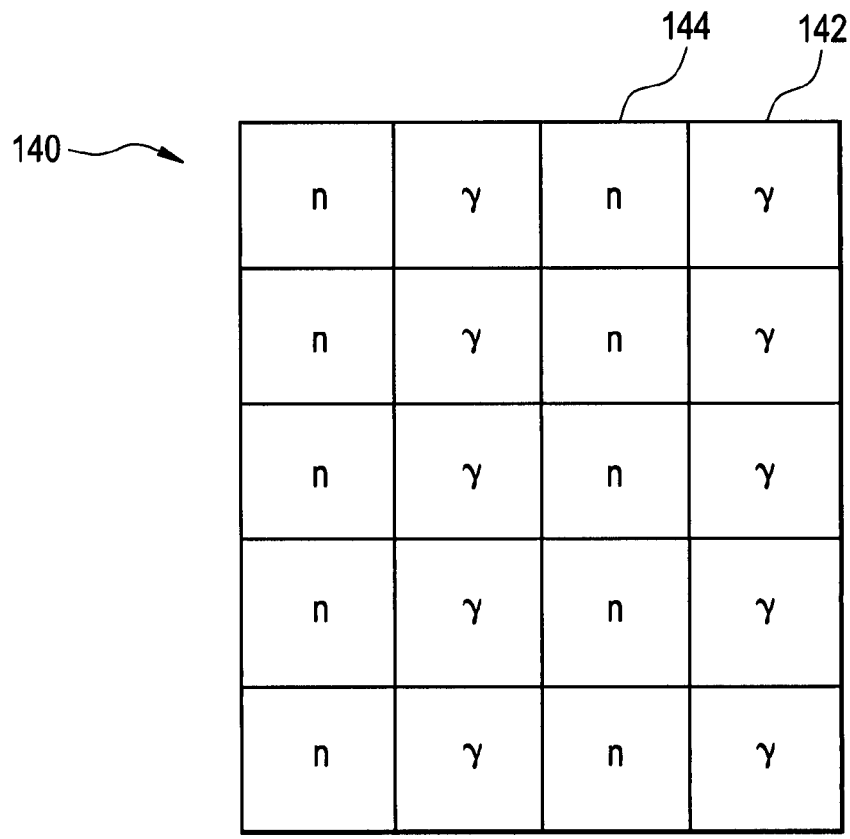
FIG. 7 illustrates a dual modality detection system that includes a tiled configuration of gamma ray and neutron detectors in accordance with another embodiment of the invention.
Figure 8:
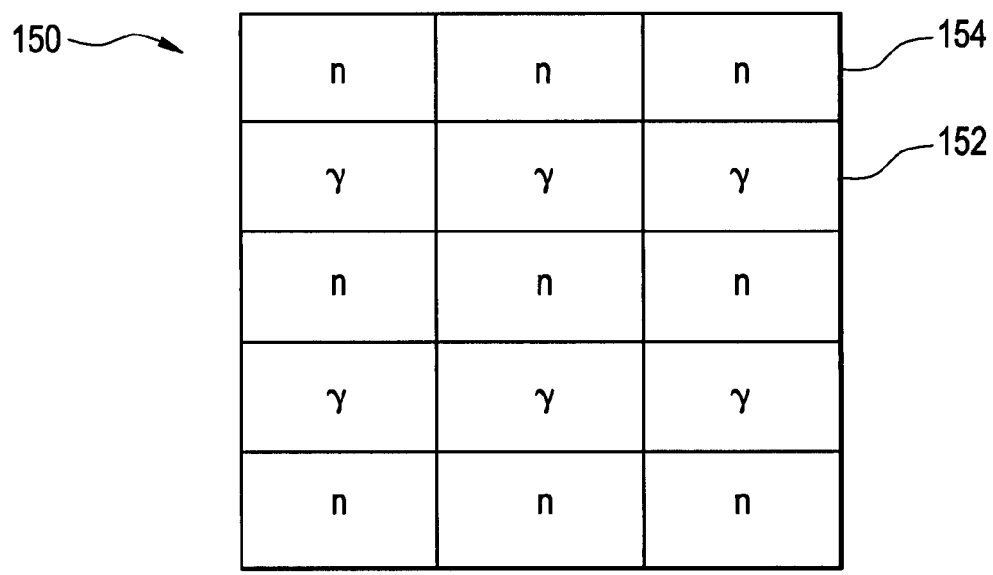
FIG. 8 illustrates a dual modality detection system that includes a tiled configuration of gamma ray and neutron detectors in accordance with yet another embodiment of the invention.

In yet other embodiments, FIG. 7 depicts a vertically tiled arrangement of the dual modality detection device 140, and FIG. 8 depicts a dual modality detection device 150 with a horizontally tiled arrangement. In FIG. 7, the gamma ray detector modules and neutron modules 142, 144, respectively, are vertically aligned in alternating columns. In FIG. 8, the gamma ray detector modules and neutron modules 152, 154, respectively, are vertically aligned in alternating rows. It should be clear to those of skill in the art that the arrangement of neutron and gamma detection modules for a dual modality system are not intended to be limited to be any particular configuration, dimension or shape, which will generally depend on the application.

Figure 9:
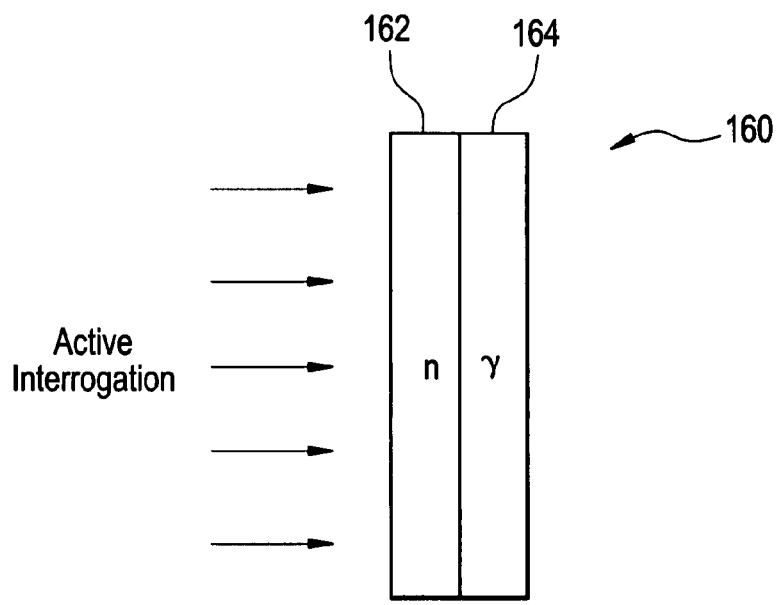
FIG. 9 is an exemplary embodiment of an integrated detection device configured for active interrogation wherein the neutron detector is disposed in front of the gamma ray detector.

FIG. 9 depicts an exemplary embodiment of a dual modality device detector 160 having a neutron detection module 162 in front of a gamma ray detection module 164. The neutron detection module 162 is located between the incident neutron and gamma flux (i.e., the result of an active interrogation) as indicated by the arrows and minimally attenuates the gamma flux as it passes through the neutron detection module 162 to be detected by the gamma ray detection module 164. In this embodiment, the scintillation medium of the gamma detection module 164 may dually function as a moderator and as reflector for the neutron detection module 202. Moreover, as previously discussed, the separate modules of either the neutron detector or the gamma detector may or may not be made of the same type of material, have the same density, have the same thicknesses, have the same dimensions, and the like.

Figure 10:
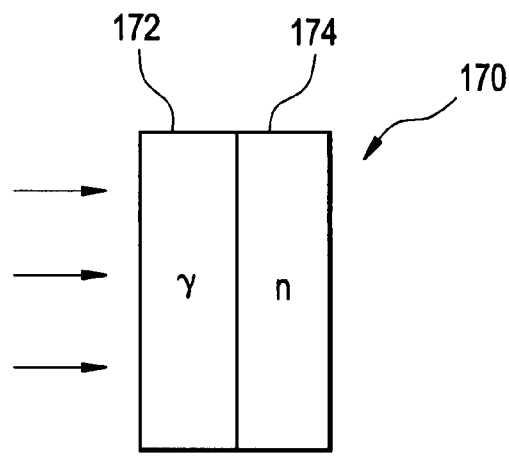
FIG. 10 is an exemplary embodiment of an integrated detection device configured for active interrogation wherein the gamma ray detector module is disposed in front of the neutron detector.

FIG. 10 illustrates another embodiment of an integrated detection system 170. In FIG. 10, the gamma detection module 172 is placed in front of the neutron detection module 174. In one embodiment, the gamma detection module is formed of an organic-based scintillation material and acts as a moderator so that the incident neutrons will be detected by the neutron detection module 174.

Figure 11:
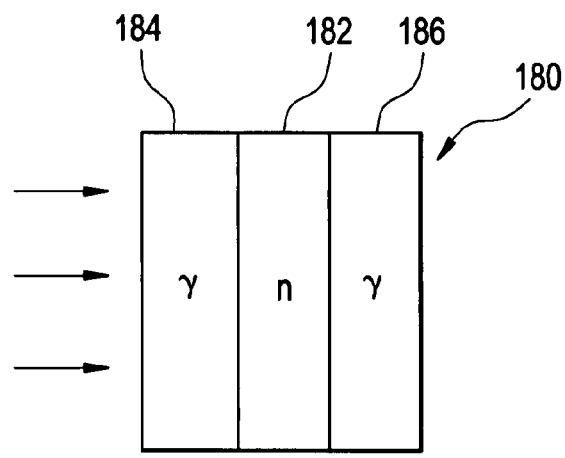
FIG. 11 is an exemplary embodiment of an integrated detection device configured for active interrogation wherein the neutron detector is sandwiched between gamma ray detector modules.

In FIG. 11, an integrated detection system 180 shows an arrangement in which the neutron detection module 182 is sandwiched between the two gamma detection modules 184, 186. In this embodiment, the gamma detection module 184 is placed in front of the neutron detection module 182 and acts as a moderator; and the gamma detection module 186, positioned behind the neutron detection module 302, acts as a reflector.

It should also be noted that the He-3 tubes are not interned to be limited. For example, the He-3 tubes and the material for forming the tubes can be of varying or fixed material densities; varying or fixed tube numbers; varying or fixed tube pressures; varying or fixed gas mixture ratios; varying or fixed moderator thickness between He-3 tubes and neutron and gamma flux; varying or fixed spacing distances between tubes; varying or fixed tube spacing material type and densities, and the like.

Likewise, the material composition of the neutron detectors is not limited to He-3 (i.e., $^3$He), and other materials, such as Li, $BF_3$, $^{10}BF_3$, etc., may be used to achieve optimal detector efficiency. As well, scintillating fibers may be used in the detection of neutrons. Additionally, the detection techniques may include total counts, counts over time, etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A dual modality detection device for simultaneously detecting gamma rays and neutrons following active interrogation of nuclear materials, the dual modality detection device comprising a tiled structure configured to detect the gamma rays and the neutrons, the tiled structure comprising:
  neutron detection modules each comprising a moderator material and a neutron sensitive material embedded within the moderator material, at least a portion of the neutron sensitive material substantially surrounded by the moderator material; and
  gamma ray detection modules each comprising a scintillator in optical communication with a photodetector and configured to be a moderator and a reflector for the neutron detection modules,
  wherein the neutron detection modules are positioned directly adjacent the gamma ray detection modules to define the tiled structure.

2. The dual modality detection device of claim 1, wherein the tiled structure comprises alternating vertical arrays of the neutron detection modules and the gamma ray detection modules.

3. The dual modality detection device of claim 1, wherein the tiled structure comprises alternating horizontal arrays of the neutron detection modules and the gamma ray detection modules.

4. The dual modality detection device of claim 1, wherein the tiled structure comprises a random array of the neutron detection modules and the gamma ray detection modules.

5. The dual modality detection device of claim 4, wherein at least a portion of the neutron detection modules and the gamma ray detection modules have different thicknesses and dimensions.

6. The dual modality detection device of claim 1, wherein the neutron detection modules are disposed at least one of in front of the gamma ray detection modules, behind the gamma ray detection modules, and between the gamma ray detection modules.

7. The dual modality detection device of claim 1, wherein active interrogation comprises injecting at least one of x-rays, neutrons, and gamma rays into a cargo container.

8. A process for simultaneously detecting gamma rays and neutrons from a nuclear material concealed in a container, the process comprising:
  actively interrogating the nuclear material disposed within the container to cause a fission reaction;
  generating the gamma rays and the neutrons characteristic of the nuclear material; and
  simultaneously detecting the gamma rays and the neutrons, wherein said detecting comprises:
    reacting the gamma rays with a plastic scintillator to emit a wavelength pattern characteristic of the gamma rays specific to the nuclear material;
    moderating an energy of the neutrons with the plastic scintillator; and
    reacting the neutrons with a neutron sensitive material to form ionized particles, the neutron sensitive material comprising scintillating fibers embedded within the plastic scintillator such that at least a portion of each scintillating fiber is circumscribed by the plastic scintillator.

9. The process of claim 8, wherein said actively interrogating the nuclear material comprises injecting high-energy neutrons or gamma rays into the container to cause a fraction of the nuclear material container therein to undergo the fission reaction and emit the gamma rays and neutrons characteristic of the nuclear material in an amount effective to be detected outside of the container.

10. The process of claim 8, wherein simultaneously detecting the gamma rays and the neutrons further comprises simultaneously detecting the gamma rays and the neutrons using at least one of a doped plastic scintillator and an undoped plastic scintillator and a gamma ray detector that is surrounded by a slow-neutron absorber.

* * * * *